United States Patent [19]

Conn et al.

[11] Patent Number: 5,291,551
[45] Date of Patent: Mar. 1, 1994

[54] HOME AGENT TELECOMMUNICATION TECHNIQUE

[75] Inventors: Gerard Conn, Brooklyn, N.Y.; Margaret H. Redberg, Red Bank; Steven D. Simon, Middletown, both of N.J.; Roger K. Simonson, Riverwoods, Ill.

[73] Assignee: AT&T Bell Laboratories, Murray Hill, N.J.

[21] Appl. No.: 781,624

[22] Filed: Oct. 23, 1991

[51] Int. Cl.[5] .............................................. H04M 5/06
[52] U.S. Cl. ................................... 379/265; 379/210; 379/201
[58] Field of Search ............................... 379/210–212, 379/265, 221, 93, 201, 214; 370/110.1

[56] References Cited

U.S. PATENT DOCUMENTS

| | | | |
|---|---|---|---|
| 4,656,623 | 4/1987 | Dalby et al. | 370/60 |
| 4,757,267 | 7/1988 | Riskin | 379/113 |
| 4,953,204 | 8/1990 | Cuschleg et al. | 379/266 |
| 5,036,535 | 7/1991 | Gechter | 379/210 |
| 5,062,103 | 10/1991 | Davidson et al. | 379/112 |

OTHER PUBLICATIONS

"AT&T Systems Ties Firms' Call Centers to Home Workers," *Wall Street Journal*, Jan. 19, 1991, p. B2.

*Primary Examiner*—James L. Dwyer
*Assistant Examiner*—Ahmad F. Matar
*Attorney, Agent, or Firm*—Robert B. Levy

[57] ABSTRACT

An agent at home (12) is enabled to receive a call from a customer (14), originally directed to a transaction-processing center (16), by first identifying, at an exchange (20) of a public switched telephone network (22), the identity of the transaction-processing center and the agent(s) designated to receive calls directed to that center. Once the agent (12) has been identified, the call is routed from a first local exchange carrier central office (18) serving the customer to a local exchange carrier central office (26) serving the agent and then to the agent across a combined voice and data line (44). Upon receipt of the call, the agent simultaneously establishes a data link with the transaction-processing center so as to complete a transaction for the customer.

14 Claims, 2 Drawing Sheets ered the customer. The method is initiated by receiving a telephone call at a customer-servicing Local Exchange Carrier (LEC) central office, the call having been directed by the customer originally to a transaction-processing center. The call is then identified, typically, although not necessarily, at an exchange of a public switched telephone network, to determine the identity of at least one home-agent who is to be designated to received the customer-initiated call. The call is then routed to an LEC central office serving the designated home-agent, and from that central office to the home-agent across a combined voice and data communications channel so that a voice link between the customer and the agent is completed. Once the voice link with the customer is initiated, the home-agent then communicates data, across the same voice and data communications channel, to the transaction-processing center to handle the customer interaction.

HOME AGENT TELECOMMUNICATION TECHNIQUE

TECHNICAL FIELD

This invention relates to a technique for providing a voice link between an agent at home and a remote customer, and a simultaneous data link between the agent and a transaction-processing center remote from the agent.

BACKGROUND OF THE INVENTION

There is now a trend for people to work in their homes where possible, rather than at a remotely situated office. Working at home affords the distinct advantage of eliminating long commutes between the office and home. There are individuals who would like to work at home for many reasons, such as to care for an infant or infirm relative, but find themselves unable to do so because of the nature of their jobs. In the past, individuals who have been employed as telemarketing agents, with the responsibility to answer telephone inquires and handle telephone transactions for customers, have generally not been able to work at home. Heretofore, it has not been possible to economically provide an agent at home with sufficient telephone service and data base access capability to enable the agent to efficiently handle customer inquires and to complete a customer transaction over the telephone. As a consequence, telemarketing agents have had to work at remote facilities (i.e., transaction-processing centers) where sufficient telephone service and data base access capability could be efficiently provided.

There are now efforts to enable a telemarketing agent to accept customer inquiries and to complete customer transactions while the agent is at home, rather than at the transaction-processing center. One such effort involves having the agent at home (the "home-agent") make an initial telephone call to the transaction-processing center so as to be connected to a private branch exchange (PBX) or an automatic call director at the center. In this way, the home-agent seizes a trunk (i.e., a line) to the transaction-processing center so that an incoming customer inquiry can be directed to the home-agent through the seized trunk. If the seized trunk were an Integrated Services Digital Network (ISDN) B and D channel trunk, then the home-agent could conduct a voice discussion with a customer, while simultaneously communicating data with a computer data base at the transaction-processing center. If the seized trunk were only capable of carrying voice signals, then a separate data trunk line between the home-agent and the transaction-processing center would be required.

The disadvantage associated with this approach is that the home-agent must remain continuously connected to the transaction-processing center to handle a customer inquiry or complete a requested transaction. Thus, the home-agent must seize an incoming trunk to the transaction-processing center for the entire length of the work period even though the trunk may remain idle for a sizable fraction of that time while the home-agent is in between customer calls. For the entire time that the trunk is seized, line charges must be paid, making this approach to providing the home-agent with sufficient telephone service and data base access capability expensive.

Thus, there is a need for a technique for efficiently providing a home-agent with both telephone service and data base access capability at a location remote from a transaction-processing center.

SUMMARY OF THE INVENTION

Briefly, in accordance with a preferred embodiment of the invention, a technique is provided for allowing at least one, and, preferably, a plurality of home-agents at separate geographic locations to handle an inquiry as well as complete a transaction for a remotely-situated customer. The method is initiated by receiving a telephone call at a customer-servicing Local Exchange Carrier (LEC) central office, the call having been directed by the customer originally to a transaction-processing center. The call is then identified, typically, although not necessarily, at an exchange of a public switched telephone network, to determine the identity of at least one home-agent who is to be designated to

DETAILED DESCRIPTION

Figure 1:
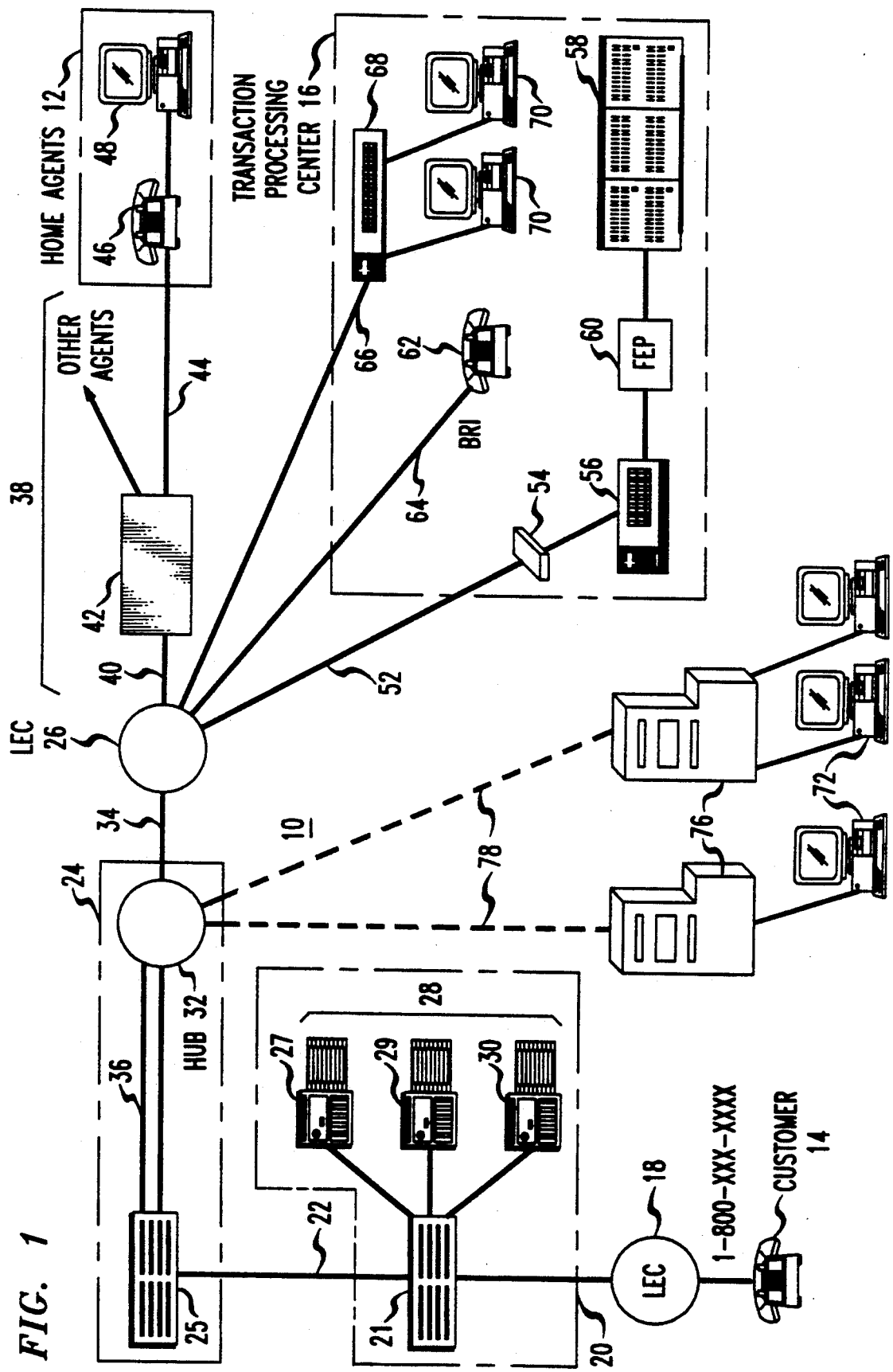
FIG. 1 is a block diagram of a telecommunications systems for practicing the invention.

FIG. 1 shows a telecommunications system 10 for practicing the method of the invention to allow one or more home-agents 12 (only one shown), at separate geographic locations, to handle calls from one or more customers 14 (only one shown) which calls are initially directed to a transaction-processing center 16. As seen in FIG. 1, each customer 14 (represented by a residential telephone set, e.g., a voice terminal) who wishes to make an inquiry or complete a transaction with the transaction-processing center 16 (e.g., a catalog order facility, a travel agent, common carrier, stock broker, etc.) begins the process by dialing a telephone number associated with the transaction-processing center. In the illustrated embodiment, the telephone number of the transaction-processing center 16 is an 800 (inbound Wide Area Telephone Service (WATS)) number 1-800 XXX-XXXX.

The call from the customer 14 is initially received by a first Local Exchange Carrier (LEC) central office 18 serving that customer. Since the call is directed to an 800 number, which is typically not served by the LEC central office 18, the call is routed to from the LEC central office to an exchange 20 of a public switch telephone network 22, such as that maintained by American Telephone and Telegraph Co. (AT&T). At the exchange 20 is a toll telephone switch 21, such as an AT&T model 4ESS ® switch.

Normally, when an 800 number call is received at the exchange 20, the destination of the call would be ascertained by the switch 21. Ordinarily, if the call were originally directed to the transaction-processing center 16, the call would then be routed across the network 22 to a second exchange 24, which serves the geographic region within which the transaction-processing center 16 is situated. At the second exchange 24, a second toll switch 25 routes the call from the customer 14 to a second local exchange carrier 26 serving the transaction-processing center 16 across specially leased trunks (not shown) for this purpose. Thus, in accordance with conventional practice, there would be one and only one destination (the transaction-processing center 16) for this customer-initiated 800-number call originally directed to the center.

The method of the present invention departs from the conventional practice of handling a customer-initiated call directed to the transaction-processing center 16. In accordance with the invention, after the customer-initiated call is routed from the first LEC central office 18 to the first toll switch 21, the switch accesses a first set of records 27 within a data base 28, to determine the identity of the original recipient of the customer-initiated call, which in this case would be the transaction-processing center 16. As should be understood, depending on the digits dialed, either the transaction-processing center 16 or another entity entirely could be the intended original recipient of the customer-initiated call.

Once the toll switch 21 identifies the transaction-processing center 16 as the original recipient of the customer-initiated call, the switch accesses a second set of records 29 in the data base 28. In accordance with the invention, the records 29 contain the number of at least one, and preferably, a plurality of the home-agents 12 to whom the customer-initiated call (originally directed to the transaction-processing center 16) is to be routed.

Having identified all of the possible home agents 12 to whom the call from the customer 14 may be routed, the switch 21 then checks a third set of records 30 in the data base 28 containing call status information about each home-agent 12. The information contained in the third set of records 30 reflects whether each home agent 12 can accept a call or whether that home-agent is busy. The information contained in the third set of records 30 is continuously updated by information sent from the home-agents 12 through the LEC central office 26 to the switch 21 on a continual basis, so that the switch knows not to route a call to an agent who is busy.

Once a set of available home-agents 12 is identified, then the switch 21 routes the customer call across the network 22 to the exchange 24, which services the LEC central office 26 that, in turn, serves a designated home agent 12 identified as being available to accept the call. In the illustrated embodiment, the LEC central office 26 services both the agent 12 and the transaction-processing center 16, so that the switch 25 at the exchange 24 routes the call to this LEC central office. Note that the home-agent 12 to whom the customer-initiated call is to be routed could be served by an LEC central office other than the LEC central office 26. Indeed, the home-agent 12 could be situated so far from the transaction-processing center 16 that the agent is served by an exchange (not shown) entirely different from the exchange 24 serving the transaction-processing center 16.

In the illustrated embodiment, the LEC central office 26 serving the home-agent 12 has been described as being sufficiently remote from the customer 14 so as to require routing of the call across the public switched network 22. It should be understood that the agent 12 could indeed be served by the LEC 18 the same as the customer 14, or alternatively, the LEC 26 which in fact serves the agent may be geographically close to the customer. Under these conditions, the call from the customer 14 to the agent 12 may not be routed over the network 22, but through the LEC central office 18 itself, or over local lines (not shown) between offices. In either case, it would still be necessary for the LEC central office 18 to have the customer-initiated call identified by the switch 21 of the exchange 20 because the original number was an 800 number. If the number for the transaction-processing center 16 were a local number, served by the LEC central office 26, this may not be necessary, as the LEC central office will contain the first set of records 28.

Referring to FIG. 1, the switch 25 at the exchange 24 may not always be located geographically proximate the LEC central office 26 serving the home-agent 12. In the illustrated embodiment, the switch 25 is located a short distance from the LEC central office 26. To facilitate a connection between the toll switch 25 and the LEC central office 26, a connection hub 32 is provided adjacent to the LEC central office and is connected to the office by a first communications channel 34. A second communications channel 36 couples the hub 32 to the switch 25. In the event that the exchange 24 and the LEC central office 26 were co-located, as may occur, the communication hub 32 could be eliminated.

The customer-initiated call, once received by the LEC central office 26, is then routed from that office to the home-agent 12, typically through a subscriber loop 38. In the illustrated embodiment, the subscriber loop 38 includes a communication channel 40, linking the LEC central office 26 to a channel bank 42, and a Basic Rate Interface (BRI) Integrated Services Digital Network (ISDN) trunk 44, with X.25 data capability, linking the home-agent 12 to the channel bank. Usually the single channel bank 42 will serve a plurality of individual customers, including one or more other home-agents 12. Once the customer-initiated call is routed to the home-agent 12 in the manner described, the incoming call is typically received by the agent on a voice terminal 46, thereby establishing a voice link with the customer. Although the call was actually received by the home-agent 12, the customer 14 believes that he or she has actually dialed the transaction-processing center 16.

The home-agent 12, having received the customer-initiated call, often must access one or more data bases at the transaction-processing center 16 in order to successfully handle a customer inquiry or complete a customer-requested transaction. To enable each home-agent 12 to access the data bases at the transaction-processing center 16, each agent is provided with a computer terminal 48 which is coupled via the subscriber loop 38 and the LEC central office 26 to the transaction-processing center. Since the ISDN trunk 44 and the channel 40 are capable of simultaneously carrying voice and data at the same time, the home agent 12 can be conducting a voice conversation with the customer 14 while simultaneously accessing the requisite information at the transaction-processing center 16 via the terminal 48. In practice, the terminal 48 comprises a conventional personal computer, such as an AT&T model 6386 personal computer, running a conventional terminal emulator package.

Figure 2:
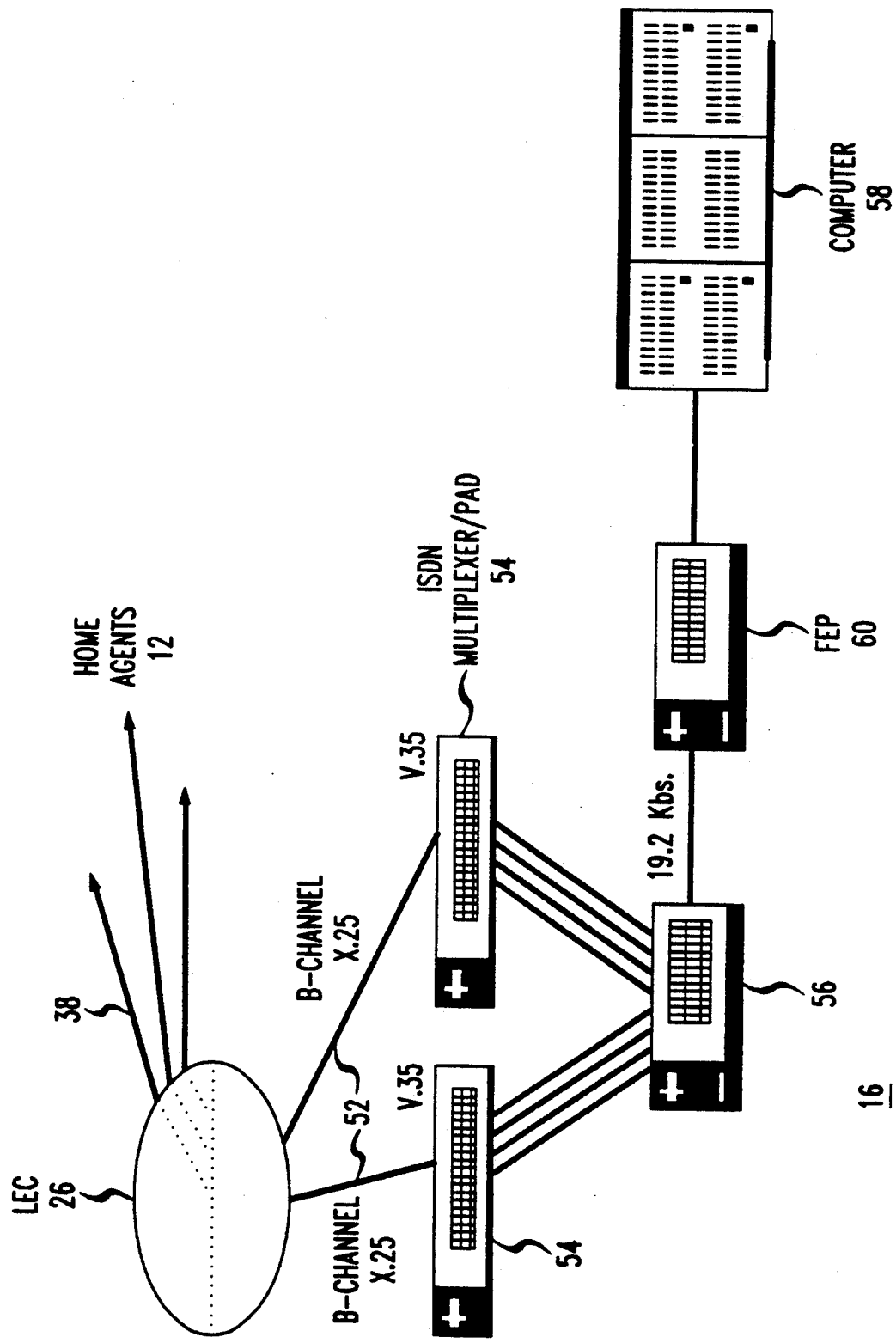
FIG. 2 is a block diagram of a portion of the telecommunications system of FIG. 1.

Referring to FIGS. 1 and 2, a data base inquiry from a home-agent 12 is routed, via the subscriber loop 38, to the LEC central office 26 and from the office to the transaction-processing center 16 via one or more ISDN trunks 52 (a single such trunk is shown in FIG. 1 and two are trunks shown in FIG. 2) Each ISDN trunk 52 is a "B" channel type trunk with X.25 data capability. The incoming inquiries (e.g., packets of data) which are received on each trunk 52 are disassembled by an assembler/disassembler 54, only one such assembler/disassembler being shown in FIG. 1. Referring to FIG. 2, each assembler/disassembler 54 is coupled via multiple RS 232 lines to a protocol converter 56, typically a Memorex-Telex model MCS 6544 controller. The protocol converter 56 serves to convert the protocol of signals received from the assembler/disassemblers 54 to a format suitable for input to a bank of computers 58 which store the information to be accessed by the agents 12. While the protocol converter 56 could feed the computers 58 directly, it is desirable to interpose a front-end processor 60 between the analyzer and the computers to facilitate flexibility (e.g., to facilitate a larger network).

Referring to FIG. 1, at least one voice terminal 62 is located at the transaction-processing center 16 and is coupled to the LEC central office 26 via a voice trunk 64 to allow personnel to initiate a voice telephone conversation with one of the home-agents 12 or other parties as required. Typically, multiple voice terminals 62 will be found at the transaction-processing center. Status information and reports from the LEC central office 26 are supplied to the transaction-processing center 16 via an analog trunk 66 which feeds a file server 68 (e.g., a personal computer) at the center. The file server 76 is typically accessed through one or more terminals 70. The voice communications carried on the trunk 64, and the status information received on the trunk 66, while useful, are not critical to the ability of the transaction-processing center 16 to transmit data to, and receive data from, the home-agent 12.

From time to time, information contained in the second set of records 29 in the data base 27, detailing the routing of customer-initiated calls to the home-agents 12, must be updated. For example, one or more home-agents 12 may not be scheduled to work a particular day, or a malfunction may exist preventing calls from being routed from the customer 14 to a particular one of the agents 12. The information stored in the second set of records is updated through one or more terminals 72, which, in the illustrated embodiment, are located at one or more facilities 76, each electrically linked to the communications hub 32 through a separate communications channel 78. While the facilities 76 in the preferred embodiment are separate from the transaction-processing facility 16, one or more terminals (not shown) could be provided at the transaction-processing facility and would be linked to the communications hub 32 in a manner similar to the terminals 72 for updating the record set 29.

As described above, the call-routing information, i.e., the identity of the transaction-processing center 16, the identity of the home-agents 12 associated with that center, and the call status information of these agents, is stored in the data base 27 at the first exchange 20. The reason for storing this information at the exchange 20 is that the home-agents 12 may not necessarily all be served by the same LEC central office 26, or even the same toll exchange 24. Where all of the home-agents 12 are serviced by the same LEC central office 26, the second and third sets of records 29 and 30 containing the identity of the home agents and their call status, respectively, would typically be stored at this LEC central office, rather than at the toll exchange 24. Under these conditions, the data base 27 would only contain the first set of records 28 which identifies the particular LEC central office (e.g., LEC central office 26) where a customer call, originally directed to the transaction-processing center 16, should be routed. Actual routing of such a call to a particular one of the home-agents 12 would be performed by the LEC central office 26, using a data base (not shown) containing information that had previously been contained in the second and third sets of record set 29 in FIG. 1.

The foregoing describes a technique for routing to one or more home-agents a call initiated by a customer 14 to a transaction-processing center 16 and for simultaneously enabling the home-agent to access information from the transaction-processing center to complete a customer transaction. The routing of the call is such that only when the call is actually received by the home-agent 12, will the subscriber loop circuit 34 between the agent and the transaction-processing center 16 be seized, thereby minimizing line charges.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for allowing an agent at home to communicate with a remotely situated customer and to simultaneously complete a transaction for such customer using a data base at a transaction-processing center remote from the agent, comprising the steps of:

receiving, at a customer-servicing Local Exchange Carrier (LEC) central office, a customer-initiated telephone call originally directed to a transaction-processing center;

identifying at least one agent at home designated to receive the customer-initiated telephone call originally directed to the transaction-processing center;

routing the customer-initiated call from the customer-servicing LEC central office to an agent-servicing LEC central office serving the designated agent at home;

transmitting the call from the agent-servicing LEC central office to the designated agent at home across a combined voice and data communications channel to establish a voice link between the customer and the agent at home; and simultaneously communicating data between the agent at home and the transaction-processing center across the voice and data communications channel once a voice link between the agent at home and the customer is established.

2. The method according to claim 1 wherein the identifying step comprises the steps of:

accessing a first set of records containing all possible numbers dialed by the customer to identify the transaction-processing center the customer intended to call;

accessing a second set of records containing a list of agents at home which are to receive a call originally directed to the transaction-processing center identified from the first data base; and accessing a third set of records containing call status information concerning the availability of each of the agents identified in the second set of records.

3. The method according to claim 1 wherein the routing step comprises the steps of:

routing the call from the customer-servicing LEC central office to a first exchange of a public switched telephone communications network;

transmitting the call across the public switched telephone communications network to a second exchange proximate the LEC central office serving the agent at home; and routing the call from the second exchange to the LEC central office serving the agent at home.

4. The method according to claim 1 wherein the step of simultaneously communicating data between the agent at home and the transaction-processing center includes the step of establishing a data path connection between the agent at home and the transaction-processing center through an LEC central office serving the transaction-processing center.

5. A system for allowing an agent at home to communicate with a remotely situated customer and to simultaneously complete a transaction for such customer using a data base at a transaction-processing center remote from the agent, comprising:

a first Local Exchange Carrier (LEC) central office for receiving a customer-initiated call originally directed to a transaction-processing center;

a first exchange of a public switched telephone network coupled to the first LEC central office;

means located at, and associated with, the first exchange for identifying at least one of a plurality of agents at home designated to receive the customer-initiated call;

means for routing the customer-initiated call from the first LEC central office to a second LEC central office serving the agent at home; and a combined voice and signal data path for carrying the customer-initiated call from the second LEC central office to the agent and for simultaneously carrying data from the agent to a transaction-processing center.

6. The system according to claim 5 wherein said means for identifying at least one agent to receive the customer-initiated call comprises:

a first set of records for identifying the transaction-processing center to which the customer-initiated call was originally directed;

a second set of records for identifying at least one agent at home to receive the customer-initiated call directed to the transaction-processing center identified by the first set of records; and a third set of records for identifying the current call status of each home-agent identified by the second set of records to determine the availability of such home-agents.

7. The system according to claim 6 further including means for updating the second set of records.

8. The system according to claim 7 wherein the updating means comprises:

at least one data entry terminal; and a communications channel for coupling each data entry terminal to the first exchange.

9. A system for allowing an agent at home to communicate with a remotely situated customer and to simultaneously complete a transaction for such customer using a data base at a transaction-processing center remote from the agent, comprising:

a first Local Exchange Carrier (LEC) central office for receiving a customer-initiated call originally directed to a transaction-processing center;

a first exchange of a public switched telephone network coupled to the first LEC central office;

means located at, and associated with, the first exchange for identifying at least one of a plurality of agents at home designated to receive the customer-initiated call;

means for routing the customer-initiated call from the first LEC central office to a second LEC serving the agent at home;

a combined voice and signal data path for carrying the customer-initiated call from the second LEC central office to the agent and for simultaneously carrying data from the agent to a transaction-processing center;

means associated with the agent at home for receiving the customer-initiated call and for communicating data to the transaction-processing center; and means associated with the data processing center for storing data accessed by and received from the home-agent.

10. The system according to claim 9 wherein said means for identifying at least one agent to receive the customer-initiated call comprises:

a first set of records for identifying the transaction-processing center to which the customer-initiated call was originally directed;

a second set of records for identifying at least one agent at home to receive the customer-initiated call directed to the transaction-processing center identified by the first set of records; and a third set of records for identifying the current call status of each home-agent identified by the second set of records to determine the availability of such home-agents.

11. The system according to claim 10 further including means for updating the second data base.

12. The system according to claim 11 wherein the updating means comprises:

at least one data entry terminal; and a communications channel for coupling each data entry terminal to the first exchange.

13. The system according to claim 9 further including at least one voice terminal at the transaction processing center and coupled to the second LEC central office for communicating voice information from the transaction-processing center to the home agent.

14. The system according to claim 9 further including means at the transaction-processing center and coupled to the second LEC central office for receiving status information therefrom.

* * * * *